W. P. GORDON AND T. B. JACOCKS.
INNER TUBE.
APPLICATION FILED MAY 22, 1920.
1,392,826.
Patented Oct. 4, 1921.
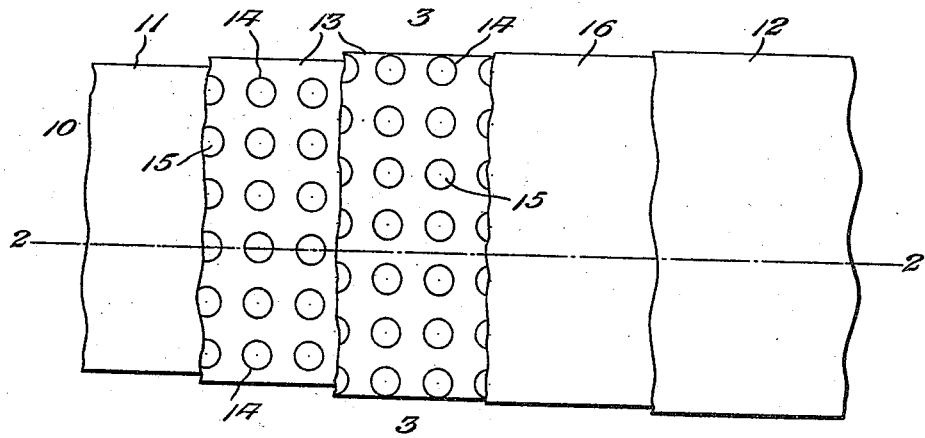
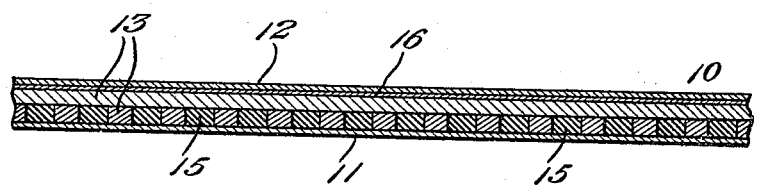
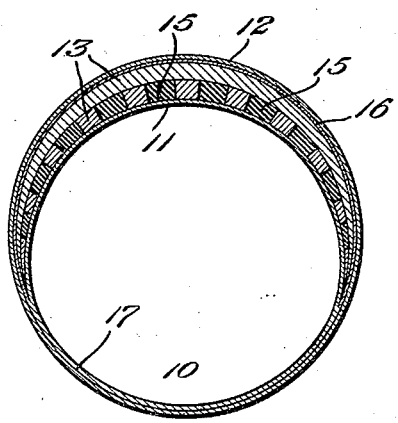
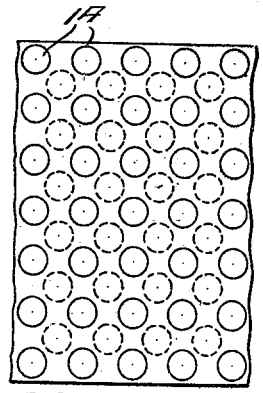
W. P. Gordon
T. B. Jacocks   INVENTORS
BY Victor J. Evans
ATTORNEY
WITNESS:

UNITED STATES PATENT OFFICE.

WILEY P. GORDON, OF EDGEFIELD, SOUTH CAROLINA, AND THOMAS B. JACOCKS, OF TARBORO, NORTH CAROLINA.

INNER TUBE.

1,392,826.  Specification of Letters Patent.  Patented Oct. 4, 1921.

Application filed May 22, 1920. Serial No. 383,511.

*To all whom it may concern:*

Be it known that we, WILEY P. GORDON and THOMAS B. JACOCKS, both citizens of the United States, residing, respectively, at Edgefield, in the county of Edgefield and State of South Carolina, and Tarboro, in the county of Edgecombe and State of North Carolina, have invented new and useful Improvements in Inner Tubes, of which the following is a specification.

This invention relates to pneumatic tires for vehicles and has especial relation to the construction of inner tubes for such tires.

An object of the present invention is the provision of an inner tube for pneumatic tires which is constructed so that a puncture of the tube will be automatically closed as soon as it occurs, the tube being provided with a plastic material or "dough" which will work into and close the puncture.

One of the principal objects of the invention is the provision of means for retaining this plastic material or "dough" in position, so that it will always remain around the tread portion of the tire, the said material or dough having a tendency to creep or run, especially when heated, so that it is necessary to provide some means of retaining it upon that portion of the tire most likely to receive a puncture.

Other objects and advantages of the invention will appear as the following description is read in connection with the accompanying drawings.

In the drawings:—

Figure 1 is a fragmentary plan view of a portion of an inner tube constructed in accordance with the invention, parts being broken away to more clearly illustrate the structure.

Fig. 2 is a sectional view on the line 2—2 of Fig. 1.

Fig. 3 is a similar view on the line 3—3 of Fig. 1.

Fig. 4 is a fragmentary plan view of a portion of one of the retaining members and illustrating by dotted lines the relative position of the openings of the other retaining member.

Referring to the drawings in detail, wherein like characters of reference denote corresponding parts, the tube which is indicated at 10 is made up of a pair of elastic tubes arranged one within the other, the inner tube being indicated at 11 and the outer tube at 12.

Arranged between the tubes 11 and 12 is a plastic material or dough, the latter being disposed around the tread of the portions of the tubes and in order to hold the plastic material in position there is provided retaining members in the form of strips of rubber or other material having the proper elasticity. In the tube shown there is provided two of these strips which are indicated at 13, and which are arranged in superposed relation. This number may be varied however to suit conditions as one strip may be sufficient for tires of small diameter. The strips 12 are provided with spaced openings 14 and these openings provide individual compartments for the reception of the plastic material or dough which is indicated at 15. It is preferred to arrange the strips in such manner that the openings 14 of one strip will be staggered with respect to the openings of the other strip, so that the tread portion of the tube will be practically covered in a manner that a puncture will intersect one of these openings. The character of the plastic material or dough is such that it will work into the puncture and close the same as will be readily understood.

The strips 13 extend approximately two-thirds around the diameter of the tube and the outermost strip is covered with a layer of fabric 16, so that the openings 14 will provide closed compartments for retaining the plastic material or dough 15. The strip of fabric 16 lies between the outermost strip or rubber 13 and the outer member 12 of the tube, the opposite or inner portion of the tube which is indicated at 17 being formed entirely of rubber so as to lend sufficient elasticity when the tire is inflated.

The invention is susceptible of various changes in its form, proportions and minor details of construction and the right is herein reserved to make such changes as properly fall within the scope of the appended claims.

Having described the invention what is claimed is:—

1. The combination with a tube for pneumatic tires, of a plurality of individual compartments provided around the circumference of the tube and arranged in superposed staggered relation and a filling material within said compartments, said material being adapted to enter and fill a puncture in said tube.

2. The combination with a tube for pneumatic tires, of a plurality of closed individual compartments provided around the circumference of the tube and a plastic filling material within each of said compartments, said material being adapted to enter and fill a puncture in said tube.

3. An inner tube for pneumatic tires comprising a pair of elastic tubes arranged one within the other, a plurality of individual compartments arranged between the tubes and a filling material within said compartments, said material being adapted to enter and fill a puncture in said tube.

4. An inner tube for pneumatic tires comprising a pair of elastic tubes arranged one within the other, a layer of elastic material located between the tubes and provided with openings to provide individual compartments and a filling material within said compartments, said material being adapted to enter and fill a puncture in said tube.

5. An inner tube for pneumatic tubes comprising a pair of elastic tubes arranged one within the other, a plurality of layers of elastic material located between the tubes, said layers of elastic material having openings therein arranged in superposed staggered relation and positioned between the tubes and a strip of fabric interposed between the outermost layer of elastic material and the outermost tube.

In testimony whereof we affix our signatures.

WILEY P. GORDON.
THOMAS B. JACOCKS.